United States Patent [19]

Umegai et al.

[11] Patent Number: 4,885,833
[45] Date of Patent: Dec. 12, 1989

[54] APPARATUS AND METHOD FOR MOUNTING WINDOW GLASSES ON AUTOMOBILE

[75] Inventors: Shigehiro Umegai; Teruhisa Noguchi; Hirobumi Morita; Takashi Uehara; Takayuki Hoshino, all of Sayama, Japan

[73] Assignee: Honda Giken Kogyo Kabushiki Kaisha, Tokyo, Japan

[21] Appl. No.: 253,451
[22] Filed: Oct. 5, 1988
[51] Int. Cl.[4] .............................................. B23Q 17/00
[52] U.S. Cl. ....................................... 29/407; 29/701; 29/703; 29/709; 414/620; 414/627; 901/10; 901/35
[58] Field of Search .................. 29/701, 703, 705, 822, 29/407, 709; 414/620, 627, 786; 901/7, 10, 13, 14, 18, 19, 35

[56] References Cited

U.S. PATENT DOCUMENTS

| | | | |
|---|---|---|---|
| 4,453,303 | 6/1984 | Leddet | 29/701 |
| 4,561,176 | 12/1985 | Leddet | 29/709 |
| 4,589,184 | 5/1986 | Asano | 29/407 |
| 4,589,199 | 5/1986 | Ohtaki | 29/407 |
| 4,654,949 | 4/1987 | Pryor | 29/709 |
| 4,669,168 | 6/1987 | Tamura | 29/709 |
| 4,670,974 | 6/1987 | Antoszewski | 29/703 |
| 4,779,336 | 10/1988 | Inoue | 29/822 |
| 4,789,417 | 12/1988 | Komatsu | 901/7 |

FOREIGN PATENT DOCUMENTS 0147301 7/1985 European Pat. Off. .
61-122086 6/1986 Japan .

Primary Examiner—Timothy V. Eley
Assistant Examiner—K. Jordan
Attorney, Agent, or Firm—Armstrong, Nikaido, Marmelstein, Kubovcik & Murray

[57] ABSTRACT

A robot having a robot arm swingable from a position outside a car body conveying line to the line and movable in the directions of length, width and height of the car body is provided with a support frame carrying a jig for holding the window glass. The frame is tiltably mounting on the arm via a tilting shaft. A first detector is mounted on the frame for detecting a deviation the car-width direction of the jig with respect to the window portion. A pair of second detectors are provided on the frame at positions which are symmetrical with respect to the car width direction center line of the jig for detecting deviations in the plane of the window opening. First, deviation detected by the first detector is corrected by moving the jig in the car width direction. Then, deviation in tilt detected by the second detectors is corrected by tilting the jig. Finally, deviation in height detected jointly by the second detectors is corrected by raising or lowering the jig. Thereafter, the window glass is mounted in the window portion.

6 Claims, 12 Drawing Sheets

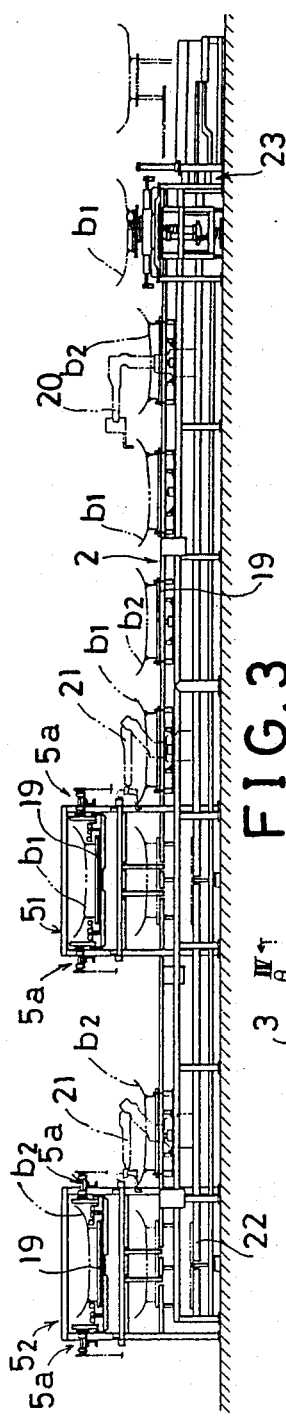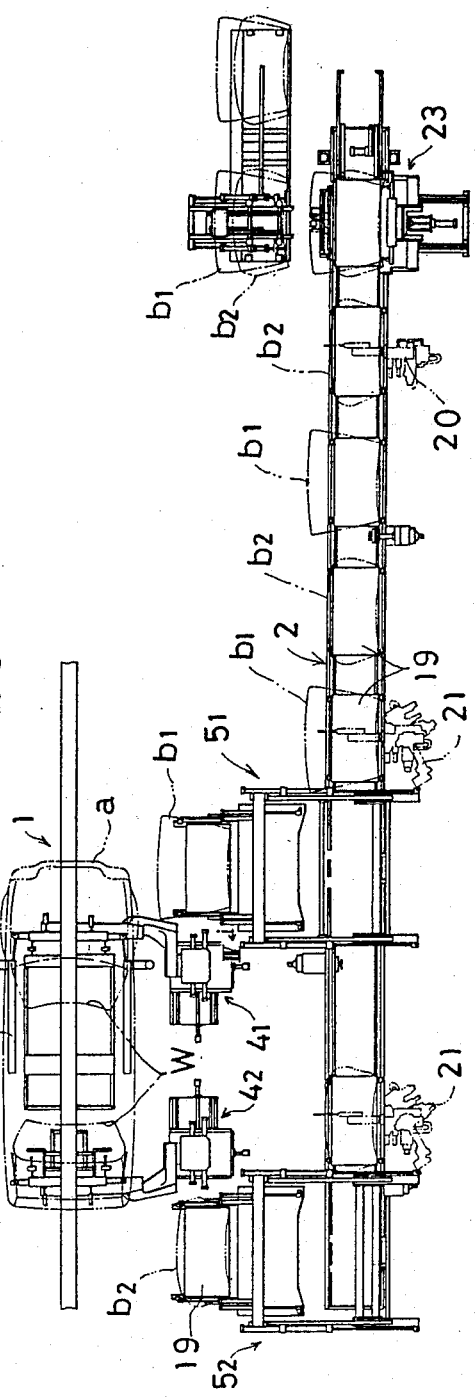

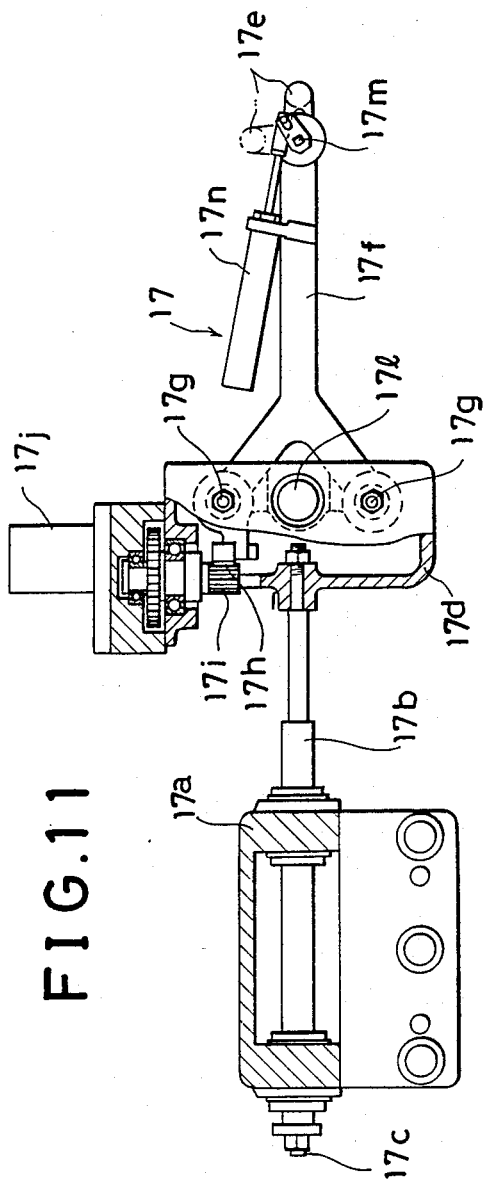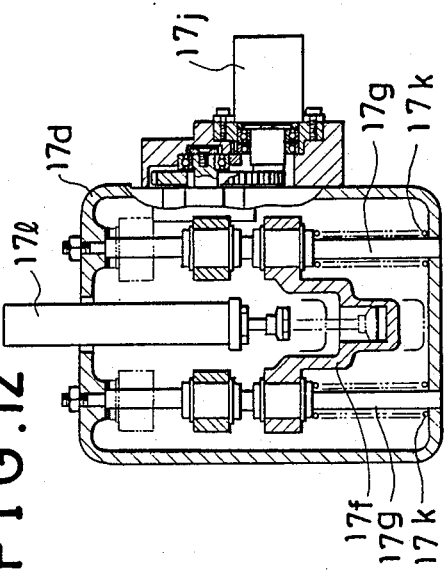
FIG.11
FIG.12

APPARATUS AND METHOD FOR MOUNTING WINDOW GLASSES ON AUTOMOBILE

BACKGROUND OF THE INVENTION

The present invention relates to an apparatus and a method for automatically mounting window glasses on the front and rear windows of the automobile body.

In a known conventional apparatus of this kind, as in Japanese Patent Laid-Open No. 36770/1983, a jig for holding the window glass is supported on a support frame so that it can be moved back and forth on the support frame. The support frame is mounted on a robot. The robot positions that support frame at a location facing the window of the automobile body being carried on the car body conveying line and, with the support frame held at this position, the jig is advanced toward the window to mount the window glass unit. In this apparatus, the robot, which is provided to the ceiling above the car body conveying line and which is movable lengthwise and width wise of the car body, has an arm consisting of vertically swingable parallel links with the above-mentioned support frame attached to the lower end thereof. The positioning of the window glass by this robot is performed as follows. Outside the conveying line, the window glass is set in the jig. Then the robot is shifted toward the conveying line and, according to signals from various detectors attached to the support frame that detect a car body position in terms of the three directions along the length, width and height thereof, the support frame is moved in parallel with these three directions so as to be positioned at a location facing the window of the car body.

The window glass mounting apparatus mentioned above, however, has a drawback. That is, since the robot is suspended above the car body conveying line, it is necessary to carry the car body on a conveyor running on the floor in order to avoid interference with the robot. This puts constraints on the design of an automobile assembly line. For example, there arises a problem that it is not possible to adopt an assembly line in which the car body is carried by a hanger conveyor enabling both the mounting of the window glass and the assembly work associated with the under body components to be performed on the same assembly line.

Even with the above window glass mounting apparatus, it is possible to use a hanger conveyor to carry the car body if it is so arranged as to have the robot provided with a robot arm which is swingable from outside the car body conveying line toward the line. In this arrangement, the robot arm is provided at the front end with the support frame. With the arm turned away from the conveying line, the window glass is set in the jig and thereafter the arm is turned back toward the conveying line to mount the window glass. This arrangement allows the robot to be positioned outside the conveying line, which in turn permits the use of the hanger conveyor for conveying the car body.

With this arrangement, however, the weight of the support frame and jig at the front end of the robot arm causes the arm to droop forwardly downwardly, making it impossible for the window glass to be mounted at the correct position on the window portion due to the support frame inclination resulting from the front-end drooping of the arm, when the support frame is positioned simply with respect to the window portion of the car body.

The object of this invention is to provide an apparatus and a method which uses a robot having a swingable arm and which correctly mounts the window glass by adjusting the inclination of the support frame.

SUMMARY OF THE INVENTION

To achieve the above objective, this invention provides an apparatus for mounting window glasses on an automobile in which a jig for holding the window glass is supported on a support frame in such a manner that the jig can be advanced and retreated as desired with the support frame being mounted on a robot. The robot is operated to position the support frame at a location facing a window portion of a car body on a car body conveying line and, in this condition, move the jig forward to the window portion for mounting the window glass therein. The robot is equipped with a robot arm which can be swung from outside the car body conveying line to the line and is movable in the directions of the length, width and height of the car body. When the car-width direction is taken as an X-axis direction, the direction in which the upper and the lower frames of the window portion face each other taken as a Y-axis direction, and the direction perpendicular to both the X-axis and Y-axis directions taken as a Z-axis direction, the support frame is mounted on the robot arm so as to be tiltable about a tilting shaft extending in the forward-backward moving direction of the jig so that the tilting shaft faces in the Z-axis direction with the robot arm turned toward the conveying line. A first detector is provided on the support frame for detecting a deviation in the X-axis direction of the jig with respect to the window portion. A pair of second detectors are further provided on the support frame for detecting deviations in the Y-axis direction of the jig with respect to the window portion, the detection being carried out at two locations which are symmetrical with respect to the X-axis direction center line of the jig.

After the window glass is set in the jig with the robot arm turned away from the car body conveying line, the robot arm is swung toward the conveying line and the jig is moved in the Z-axis direction to the initial home position facing the window portion of the car body. Then, the deviation of the jig with respect to the window portion in the X-axis direction is detected by the first detector. According to the deviation thus detected, the jig is moved in the X-axis direction so that the axis of the tilting shaft crosses the X-axis direction center line of the window portion. Next, the deviations of the jig with respect to the window portion in the Y-axis direction are detected by the pair of second detectors located at the positions which are symmetrical with respect to the X-axis direction center line of the jig. Since the jig is already adjusted in its position in the X-axis direction as mentioned above, the difference between the two Y-axis direction deviation of the jig at the two symmetrical locations represents a parameter signifying the inclination of the jig about the Z-axis relative to the window portion. In order to correct the inclination of the jig about the Z-axis, the support frame is inclined by the tilting shaft so that the difference between the two deviations at the symmetrical locations becomes zero, with the result that the window portion center line in the X-axis direction now coincides with the center line of the jig in the X-axis direction. Finally, the jig is moved in the Y-axis direction to correct the Y-axis direction position of the jig. Now the jig is correctly positioned with respect to the window portion of the car body. The jig is advanced toward the window portion to mount the window glass on the window portion correctly.

A BRIEF DESCRIPTION OF THE DRAWINGS

The above and other objects and the attendant advantages of the present invention will become readily apparent by reference to the following detailed description when considered in conjunction with the accompanying drawings wherein:

FIG. 2 and 3 are a side view and a plan view, respectively, of the apparatus;

FIGS. 11 and 12 are cross-sectional views taken along the lines XI—XI and XII—XII, respectively, of FIG. 10;

DETAILED DESCRIPTION OF THE INVENTION

Figure 1:
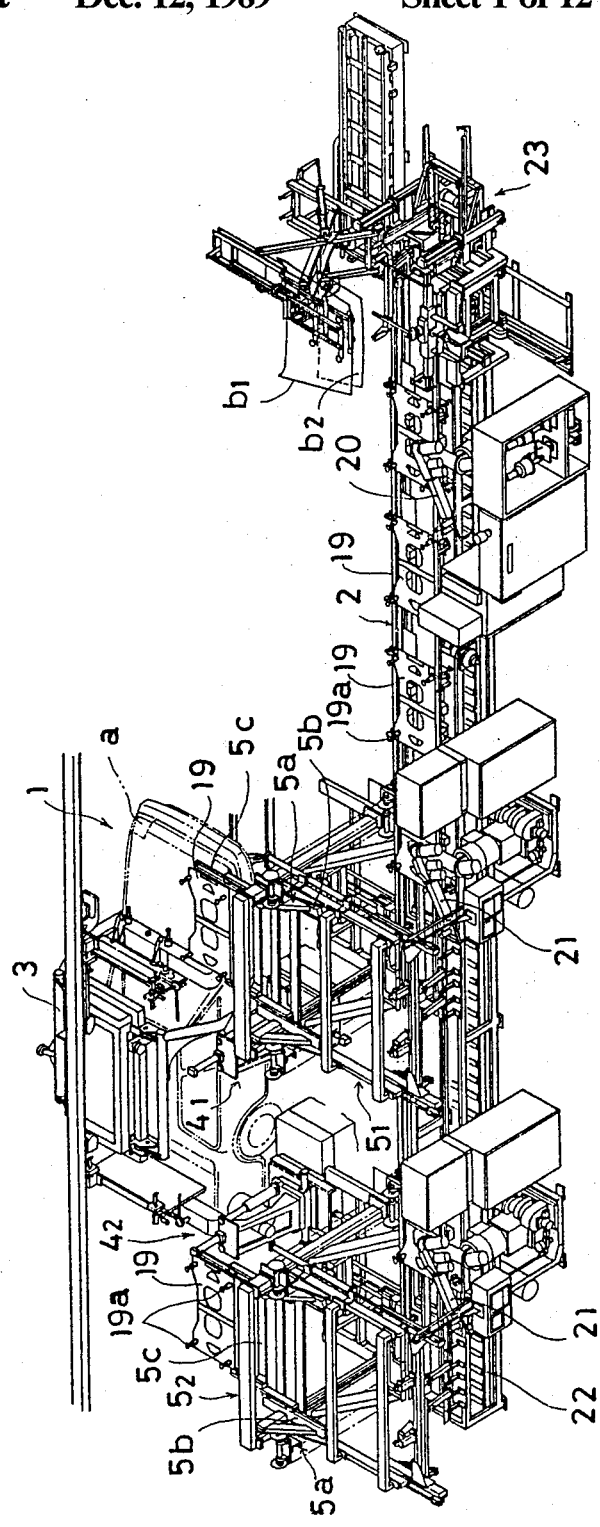
FIG. 1 is a perspective view of one example of the apparatus according to this invention.

Referring the FIGS. 1 through 3, a window glass supply line 2 is installed alongside of and in parallel with a car body conveying line 1. The car body is conveyed by a hanger conveyor 3 along the conveying line 1. Alongside of a predetermined location on the conveying line 1 where the car body is to be stopped are installed two longitudinally arranged robots $4_1$, $4_2$ and two longitudinally arranged transfer devices $5_1$, $5_2$. The two transfer devices $5_1$, $5_2$ transfer a windshield glass $b_1$ and a rear window glass $b_2$ to the robots $4_1$ and $4_2$, respectively. The front robot $4_1$ mounts the windshield glass $b_1$ on a window portion W at the front of the car body a and the rear robot $4_2$ mounts the rear window glass $b_2$ on a window portion W at the rear of the car body a.

The two robots $4_1$, $4_2$ have practically the same construction and thus the robot $4_1$ on the front side will be explained in detail in the following.

Figure 6:
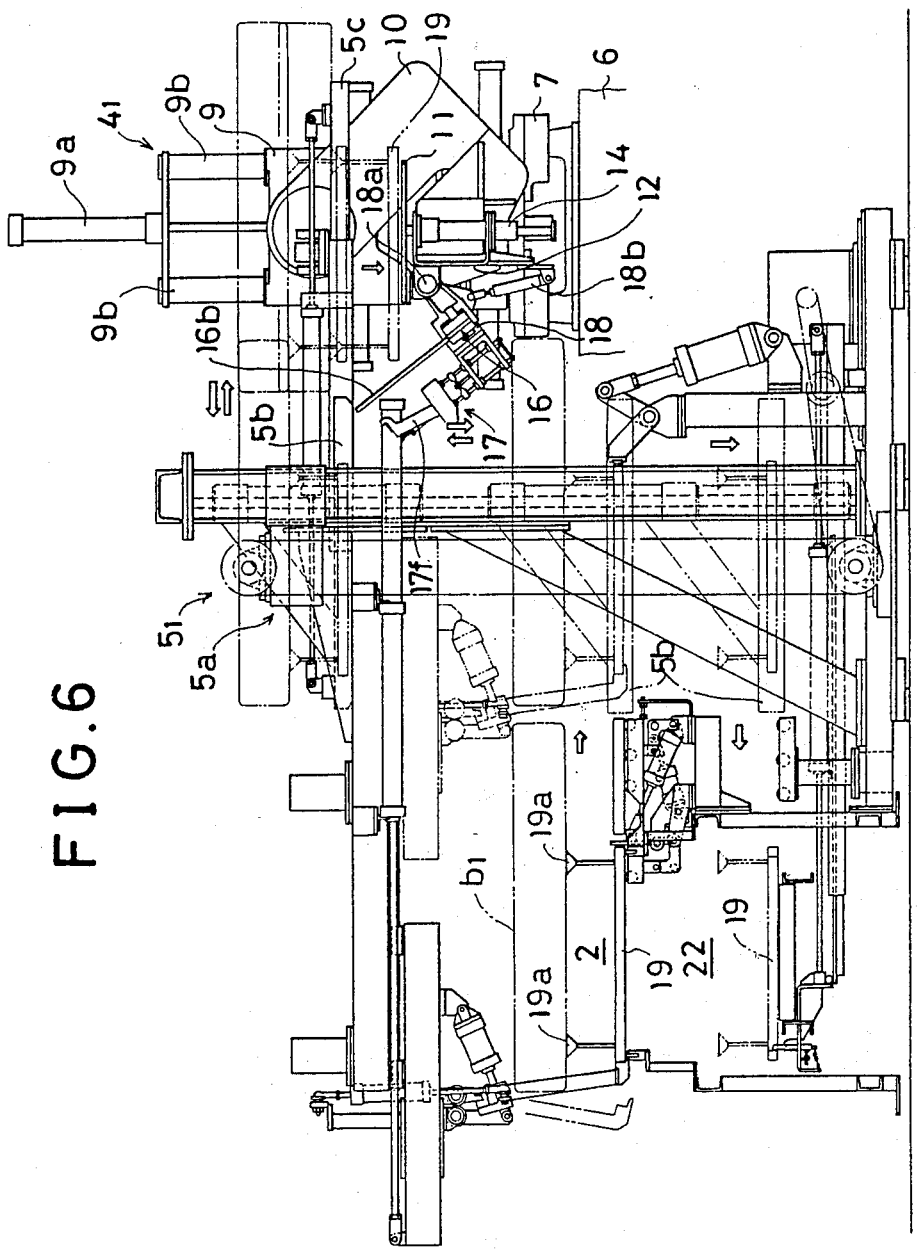
FIG. 6 is a front view of the robot when the window glass is set in the robot.
Figure 7:
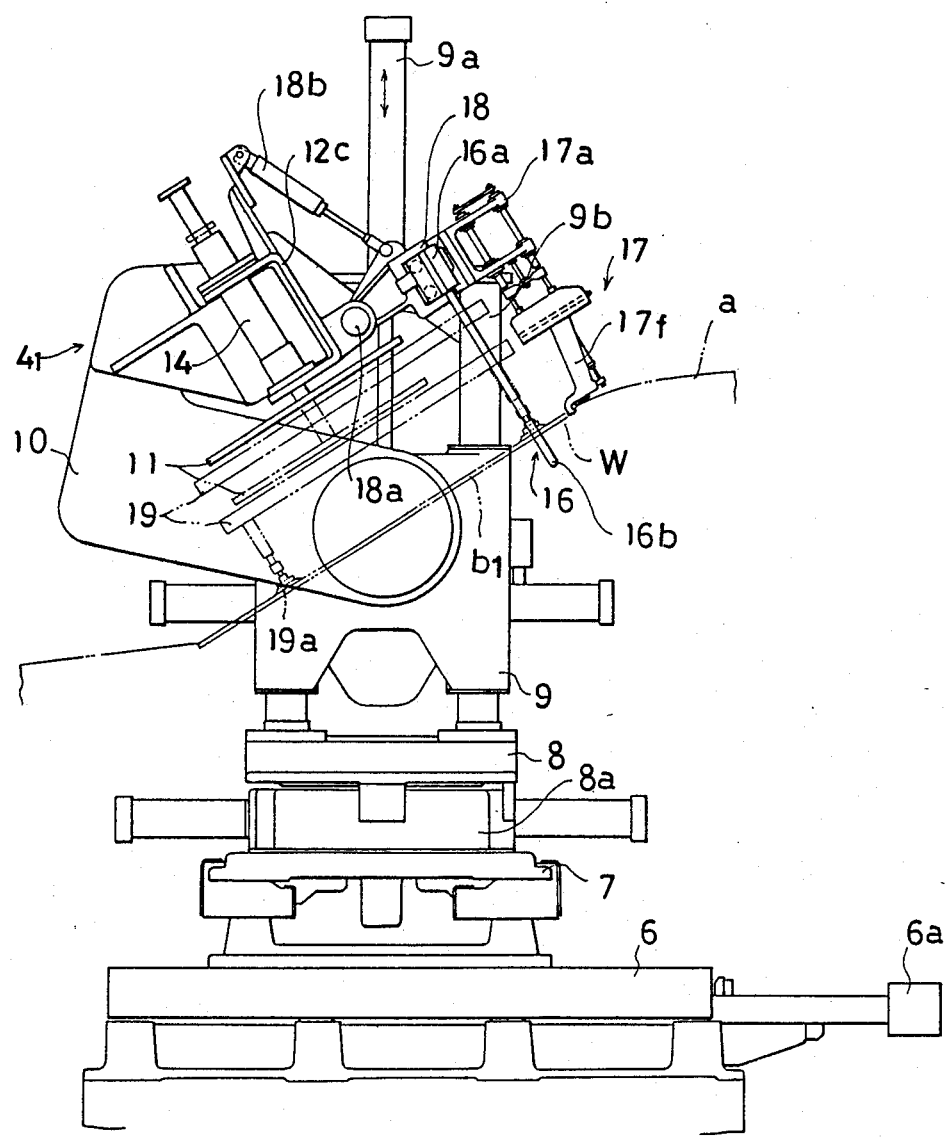
FIG. 7 is a side view of the robot when the window glass is mounted on the car body.

As shown in FIG. 4 through 7, the robot $4_1$ comprises a first slide table 6 moved by a cylinder 6a in the car-length direction. A second table 7 is mounted on the first slide table 6 and moved by a cylinder 7a in the car-width direction. A rotary table 8 is mounted on the second slide table 7 and rotated by a rotary actuator 8a about a vertical shaft. An elevating table 9 is mounted on the rotary table 8 and moved by a cylinder 9a in the car-height direction along a guide bar 9b. A robot arm 10 is pivotally mounted on the elevating table 9 so as to be reversibly rotatable about a horizontal shaft by a rotary actuator 10a. The rotary table 8 gives the robot arm 10 a swinging movement from a position outside the car body conveying line 1 to the line 1. The first and the second slide tables 6 and 7 and the elevating table 9 enable the robot arm 10 to move in the car-length, car-width and car-height directions. The robot arm 10 is provided at its front end with a support frame 12 on which a jig 11 for holding the windshield glass $b_1$ is supported in such a manner that the jig 11 can be moved back and forth. As shown in FIG. 6, the robot arm 10 is swung away from the conveying line 1 and is reversely rotated to make the jig 11 face upward. In this condition, the windshield glass $b_1$ is set on the jig 11 by the transfer device $5_1$. Then the robot arm 10 is, as shown in FIG. 7, swung toward the conveying line 1 and at the same time is reversely rotated through a predetermined angle so as to have the windshield glass $b_1$ held in a predetermined downwardly inclined position. Then the robot arm 10 is moved in the car-length, car-width and car-height directions according to the teaching data to have the support frame 12 located at an initial home position directly facing the window portion W at the front of the car body a. The support frame 12 is adjusted in position and the jig 11 is advanced toward the window portion W to mount the windshield glass $b_1$ on the window portion W.

The support frame 12 is mounted at the front end of the robot arm 10 and can be tilted about a tilting shaft 13 extending in the direction in which the jig 11 is advanced and retreated. This is described in detail in the following. The car-width direction is taken as an X-axis direction, the direction in which the upper frame and the lower frame of the window portion W face each other is taken as a Y-axis direction, and the direction perpendicular to both the X-axis and Y-axis direction is taken as a Z-axis direction. The support frame 12 is formed of a C type channel member extending along the X-axis direction when the jig 11 is positioned at the initial home position. At the ends of the support frame 12, a pair of cylinders 14, 14 are mounted in such a manner that they cross both side walls of the channel member so as to hold the jig 11 movable forwards and backwards in the Z-axis direction. At the longitudinally central part of the support frame 12, the tilting shaft 13 extending in the Z-axis direction is mounted such that it also crosses the side walls of the channel material. The robot arm 10 is then inserted into the support frame 12 and the tilting shaft 13 is passed through the front end of the robot arm 10 so that the tilting shaft 13 is supported on it. The robot arm 10 also has a drive unit 15 located near the arm-side end of the support frame 12, i.e., near the left end of the support frame 12 in FIG. 4. The drive unit 15 consists of an engagement pin 15a which engages with a recessed groove formed at said end of the support frame 12 and a cylinder 15c which is connected to the pin 15a through a connecting bar 15b. The drive unit 15 is actuated to tilt the support frame 12 about the tilting shaft 13.

Figure 8:
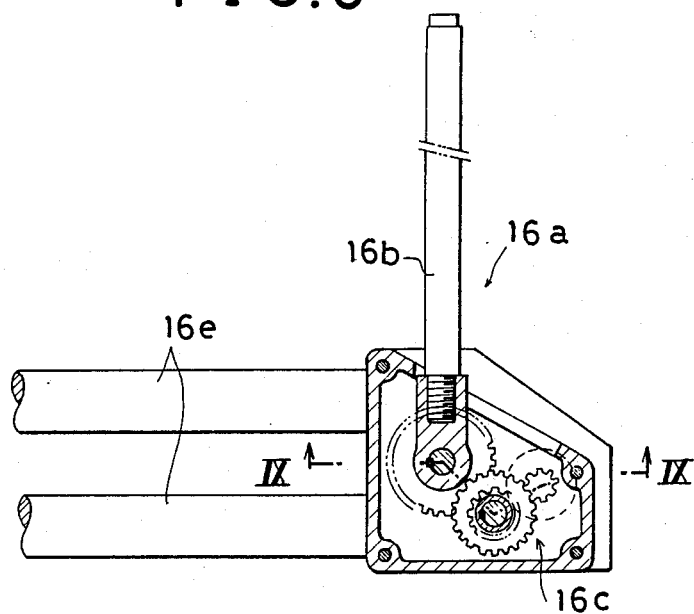
FIG. 8 is an enlarged cross-sectional plan view showing a major part of the first detector.
Figure 9:
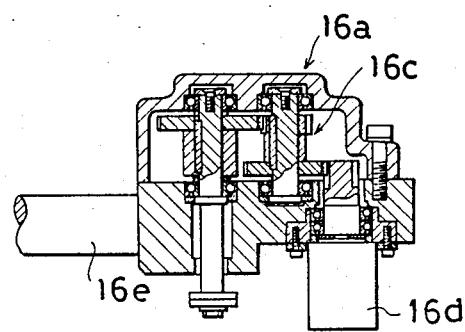
FIG. 9 is a cross-section view taken along the line IX—IX of FIG. 8.

The support frame 12 is also provided with a first detector 16 and pair of second detectors 17. The first detector 16 detects the deviation of the jig 11 relative to the window portion W in the X-axis direction and the second detectors 17 detect the displacement of the jig relative to the window portion W in the Y-axis direction. In more detail, the first detector 16 consists of a pair of detecting units 16a, 16a mounted at each end of a mounting frame 18 on the support frame 12. Each of the units 16a comprises, as showing in FIG. 8 and 9, a rod 16b mounted to be swingable on a shaft in the X-axis direction and an encoder 16d that detects the swing of the rod 16b through a gear train 16c. The two detecting units 16a, 16a are supported respectively on guide bars 16e, 16e so that they are slidable in the X-axis direction relative to the mounting frame 18. Rack bars 16f, 16f are secured to the guide bars 16e, 16e. The rack bars 16f, 16f are commonly in mesh with a pinion 16h on the output shaft of a motor 16g which is installed at the intermediate portion of the mounting frame 18. As a result, the forward or reverse rotation of the pinion 16h causes the two detecting units 16a, 16a to move synchronously with each other inwardly or outwardly in the X-axis direction.

Here, the rods 16b are urged by a spring (not shown) to swing inwardly (towards each other) in the X-axis direction. After the support frame 12 is positioned at the initial home position, the two detecting units 16a, 16a are moved towards each other in the X-axis direction so as to make the rod 16b engage, from outside, with the side frames on both sides of the window portion W and have the bars 16b, 16b swing outwardly in the X-axis direction against the force of the spring. A difference between angles of the swings made as above respectively by the rods 16b, 16b of the two detecting units 16a, 16a is used to determine a deviation in the X-axis direction of the jig 11 with respect to the window portion W.

More specifically, when the jig 11 is deviated in one direction, for example, toward the right along the X-axis car width direction, with respect to the car body a, the rod 16b of the detecting unit 16a on the left comes into contact with the left-side frame of the window portion W before the rod 16b of the detecting unit 16a on the right does so with the right side frame of the window portion W. As a result, the swing angle of the rod 16b on the left is larger than that of the rod 16b on the right. From this difference between the two swing angles, the deviation of the jig 11 in the X-axis direction is detected.

Figure 10:
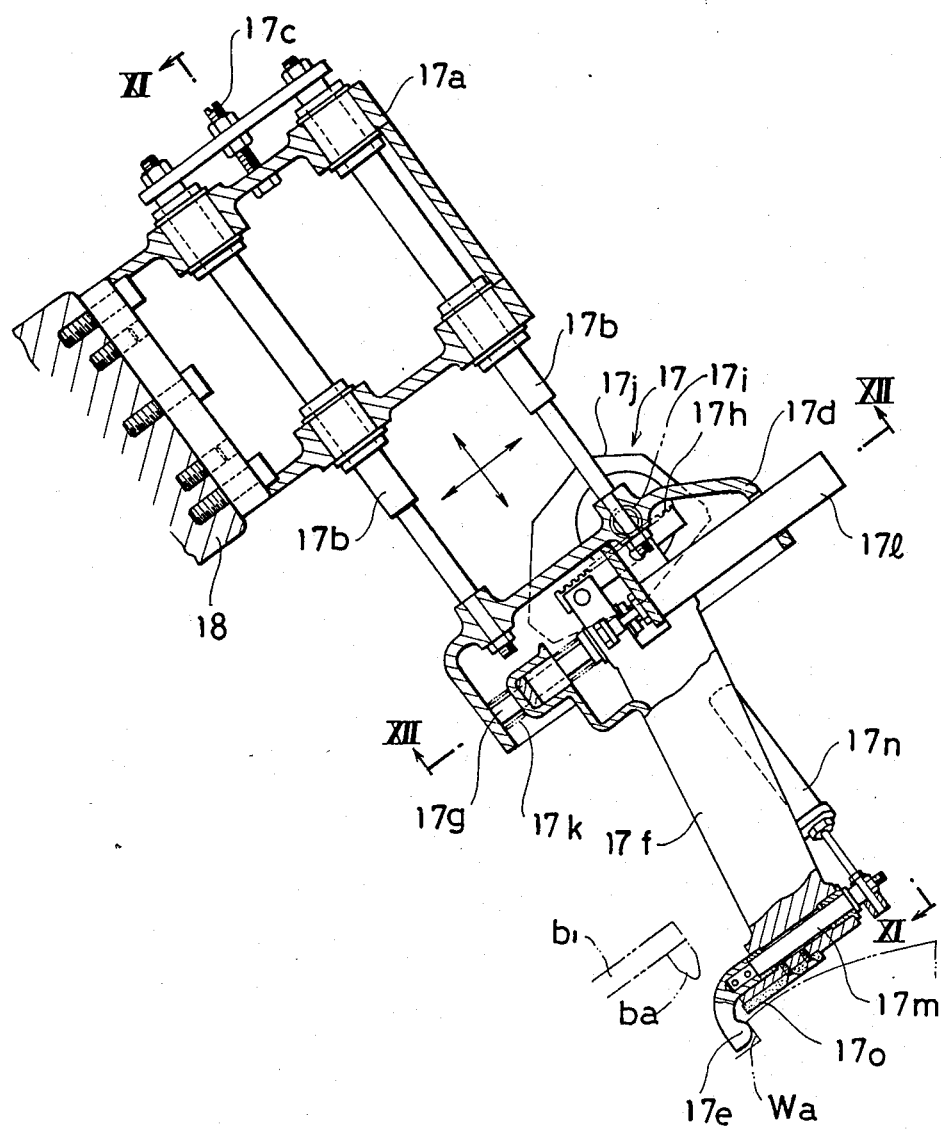
FIG. 10 is an enlarged cross-sectional side view showing a major part of the second detector.

A pair of second detectors 17 are disposed on each side of the mounting frame 18 so as to be symmetrical with respect to the center line in the X-axis direction of the jig 11. The details thereof are shown in FIGS. 10 to 12. A bracket 17d is mounted to a holder 17a secured to the mounting frame 18 through guide bars 17b, 17b and adjustment screws 17c so that the bracket 17d can be moved and adjusted in the Z-axis direction. Mounted on the bracket 17d so as to be movable in the Y-axis direction along guide bars 17g, 17g secured to the bracket 17d is a measuring arm 17f which has at the front end an engagement piece 17e that is moved in the Y-axis direction to come into contact with an upper frame Wa of the window portion W. Also mounted to the bracket 17d is an encoder 17j which has a pinion 17i engaged with a rack 17h that extends longitudinally in the Y-axis direction and is secured to the measuring arm 17f. The encoder 17j detects the position in the Y-axis direction of the measuring arm 17f. The measuring arm 17f is urged by a spring 17k in one Y-axis direction so that the engagement piece 17e is in resilient contact with the upper frame Wa. The measuring arm 17f is also driven by a cylinder 17 in the other Y-axis direction against the spring 17k. With the engagement piece 17e separated from the upper frame Wa in the Y-axis direction, it is relieved of the drive force by the cylinder 17 so as to have the engagement piece 17e come into resilient contact with the upper frame Wa. The position in the Y-axis direction for the measuring arm 17f in this condition is detected by the encoder 17j to measure the Y-axis deviation of the support frame 12 with respect to the window portion W.

The engagement piece 17e is pivotally mounted, at its rear end, on a pivotal shaft 17m which extends in the Y-axis direction so that the engagement piece 17e can be pivoted in the Z-axis direction at the front end of the measuring arm 17f. The measuring arm 17f has a cylinder 17n that turns the pivotal shaft 17m. After the jig 11 has been properly positioned, the engagement piece 17e is pivotally turned upwardly in the Z-axis direction by the cylinder 17n from the position shown in FIG. 10 so as to disengage the engagement piece 17e from the upper frame Wa. Then the measuring arm 17f is moved upwardly in the Y-axis direction to retract the engagement piece 17e to a location where it does not interfere with placement of the windshield glass $b_1$. A pad 17o is mounted to the front end of the measuring arm 17f facing the external surface of the upper frame Wa so as to protect the upper frame Wa from being scored.

In this embodiment, for the first and second detectors 16, 17 not to interfere with the setting of the windshield glass $b_1$ on the jig 11, the mounting frame 18 is pivoted downwardly in FIG. 6 by cylinder 18b, 18b about a shaft 18a extending longitudinally along the support frame 12 and thus retreated out of the way when not needed.

Figure 14:
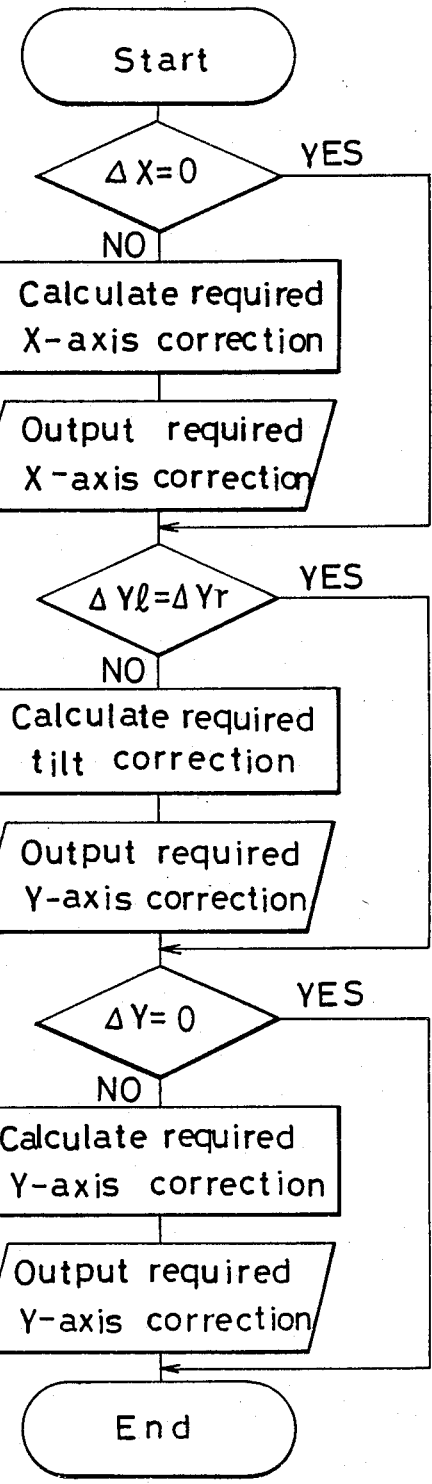
FIG. 14 is a flowchart showing the sequence of steps carried out in positioning the jig.
Figure 15A:
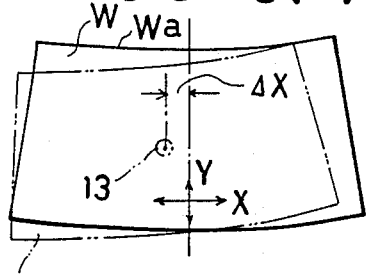
FIGS. 15a, 15b, 15c and d are diagrams showing the positional relationships between the window portion and the window glass during the process of positioning the window glass.
Figure 15B:
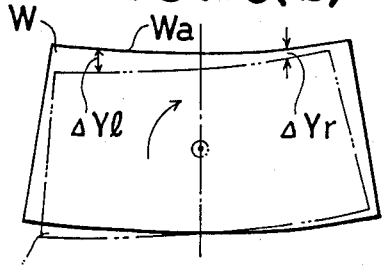

FIG. 14 shows a flowchart showing the process of positioning the jig 11. After the jig 11 is positioned and stopped at the home position, the first detector 16 detects an X-axis deviation X of the jig 11 with respect to the window portion W. At step 1 a check is made to see if the deviation X is 0 or not. When, as shown in FIG. 15(a), the jig 11 and therefore the windshield glass $b_1$ held by the jig 11 is deviated in the X-axis direction and X is not zero, the program is advanced to step 2 where the required amount of X-axis correction is calculated according to the amount of X. Then, at step 3 the required amount of X-axis correction is outputted to move the jig 11 in the X-axis direction so that, as shown in FIG. 15(b), the axial line of the tilting shaft 13 crosses the X-axis direction center line of the window portion W.

Figure 15C:
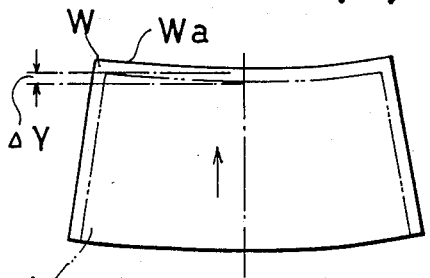

Next, the pair of the left-side and right-side second detectors 17, 17 check at the two left- and right-side locations Y-axis deviations of the jig with respect to the window portion W. At step 4 it is determined if the Y-axis deviation Y on the left and the Y-axis deviation Yr on the right coincide with each other. If the jig 11 is tilted about the Z-axis relative to the window portion W, as shown in FIG. 15(b), then Y is not equal to Yr. In this case, the program proceeds to step 5 where the required tilt correction is calculated according to a difference between the deviation Y and Yr. At step 6, the required tilt correction is outputted to tilt back the support frame 12 about the tilting shaft 13. As a result, the inclination of the jig 11 relative to the window portion W is adjusted about the Z-axis, so that the upper edge of the windshield glass $b_1$ becomes parallel with the upper frame Wa of the window portion W and the center line of the windshield glass $b_1$ with respect to the X-axis direction coincides with the center line of the window portion W with respect to the X-axis direction, as shown in FIG. 15(c).

Figure 15D:
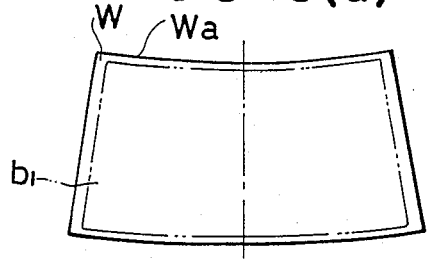

Next, the Y-axis deviations of the jig 11 detected by the secondary detectors 17, 17 are represented by a deviation Y from Y-axis direction reference deviation. At step 7 it is determined if Y is zero or not. If Y is not zero, the program goes to step 8 where it calculates the required Y-axis correction. Then at step 9, the required Y-axis correction so calculated is outputted to move the jig 11 in the Y-axis direction until it is correctly positioned as shown in FIG. 15(d).

Held in this position, the jig 11 is now advanced in the Z-axis direction and the windshield glass $b_1$ is correctly secured to the window portion W with bonding agent ba applied beforehand to the glass $b_1$.

In the example shown in the drawings, the window glasses $b_1$, $b_2$ which are held in pallets 19 each having suction disks 19a are supplied to the respective transfer devices $5_1$, $5_2$ through the window glass supply line 2. On the supply line 2, the window glasses $b_1$, $b_2$ are applied with primer and then bonding agent by robots 20, 21. Then the window glasses $b_1$, $b_2$, together with the pallets 19, are transferred onto and set in the jig 11 mounted on the robots $4_1$, $4_2$ through the transfer devices $5_1$, $5_2$.

Each of the transfer devices $5_1$, $5_2$ comprises an elevating frame 5b which is located alongside of the supply line 2 and raised and lowered by a chain lifter 5a, and a slide frame 5c of double structure which can be moved on the elevating frame 5b toward and away from where the robot is disposed. With the pallet 19 put on the slide frame 5c, the elevating frame 5b is lifted and the slide frame 5c is advanced laterally to move the pallet 19 so as to have it positioned immediately above the jig 11 positioned as shown in FIG. 6. Then, the pallet 19 is positioned and secured on the jig 11. After this, the slide frame 5c is retracted to complete the transfer of the pallet 19 onto the jig 11.

Figure 4:
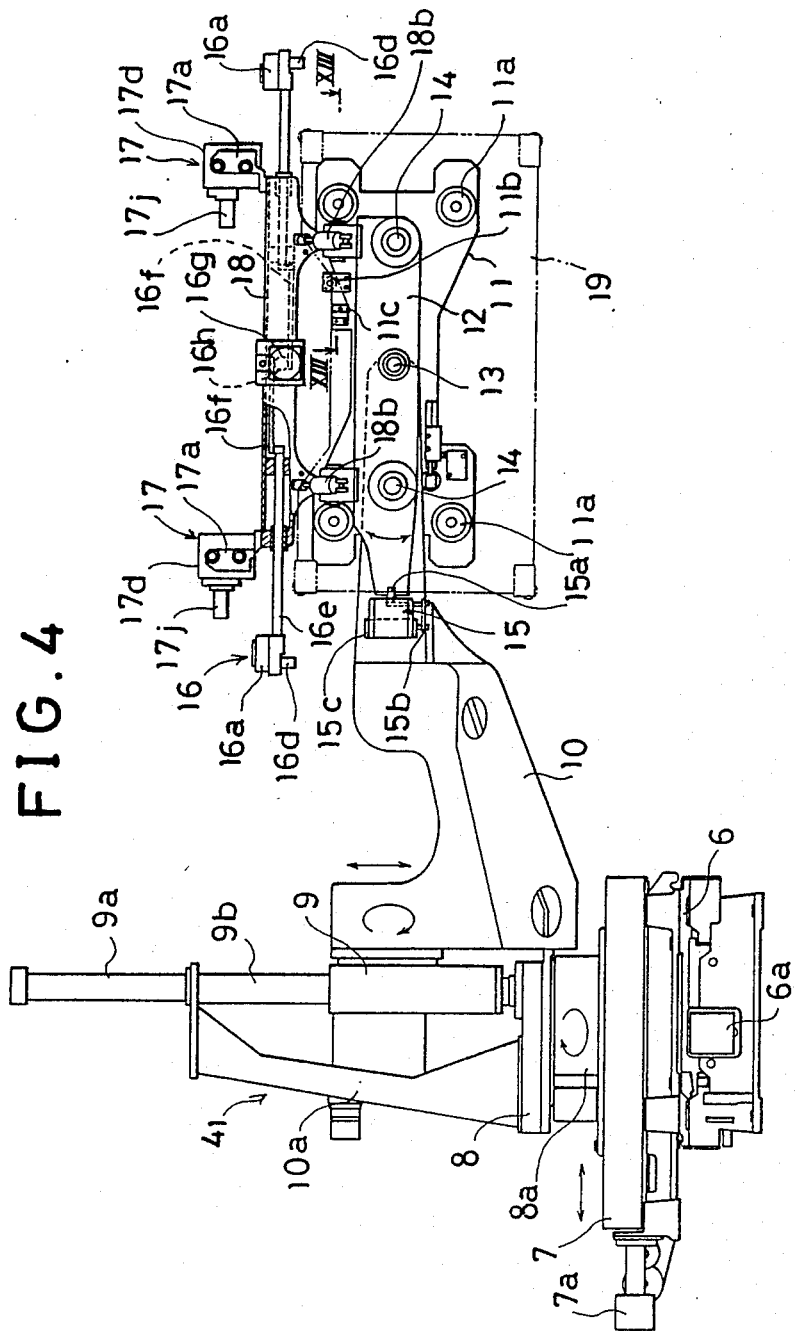
FIG. 4 is a front view of the robot as seen from the line IV—IV of FIG. 3.
Figure 5:
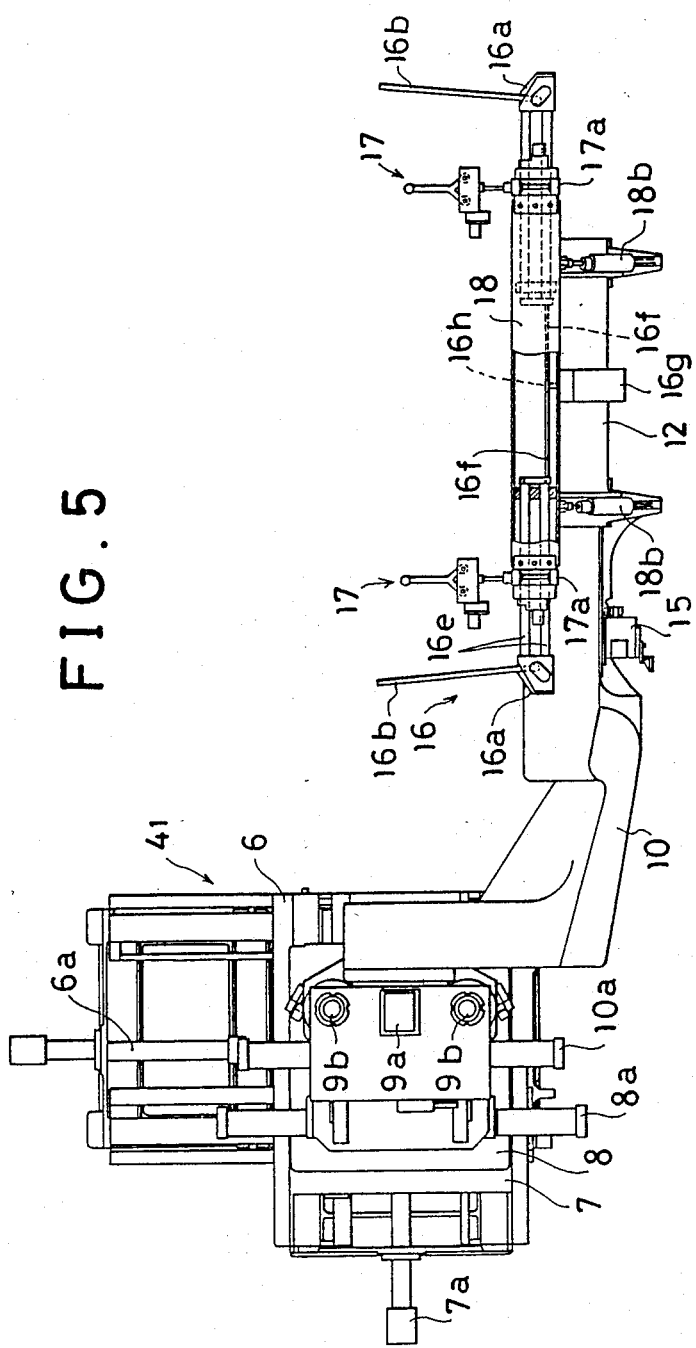
FIG. 5 is a plan view of the robot.
Figure 13:
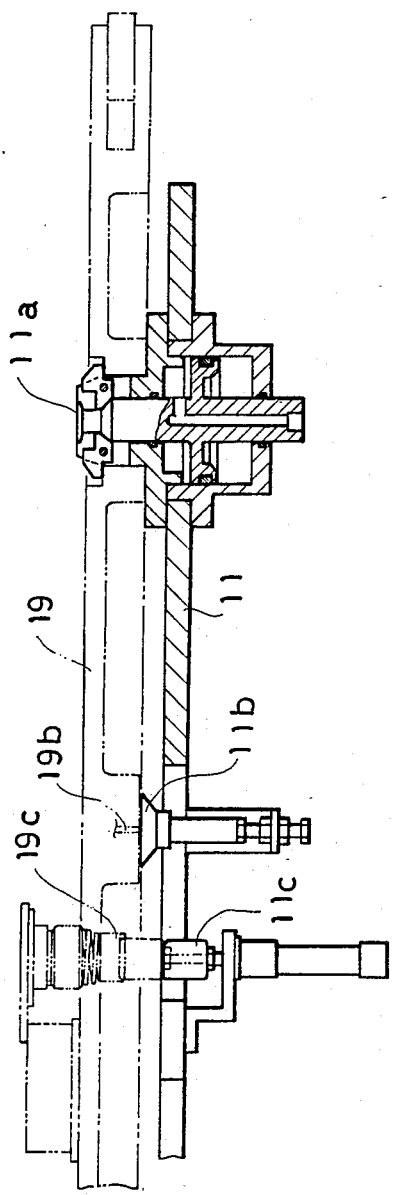
FIG. 13 is an enlarged cross-sectional view of major portion of the jig taken along the line XIII—XIII of FIG. 4.

As shown in FIG. 4 and 13, the jig 11 comprises: a plurality of clamp members 11a that removably hold the pallet 19; a vacuum pad 11b piped to the suction disk 19a on the pallet 19 with its back-side vacuum connecting portion 19b connected to the vacuum source on the robot side; and a valve operation member 11c used to operate an open air valve 19c connected to the vacuum piping on the pallet 19 in order to relieve the suction disk 19a of the vacuum action being applied thereto. After the window glasses $b_1$, $b_2$ are mounted on the window portions W as described above, the open air valve 19c is operated by the valve operation member 11c to release the window glasses $b_1$, $b_2$ from the sucking grip by the suction disks 19a. Then the robot arm 10 is swung toward outside the conveying line 1 and reversely rotated about the horizontal shaft to the position shown in FIG. 6 and at the same time the slide frame 5c is advanced to receive thereon the empty pallet 19 on the jig 11. Next, the slide frame 5c is retracted and the elevating frame 5b is lowered to discharge the empty pallet 19 onto the pallet return line 22 on the lower side of the window glass supply line 2.

A setting device 23 is provided at the front end of the supply line 2 which sets the rear window glasses $b_2$ and the front windshield glasses $b_1$ successively onto the pallets 19 that were returned via the return line 22.

As described in the foregoing, according to this invention, a window glass held through the jig on the support frame mounted at the front end of the robot arm is brought from outside the car body conveying line to the line by swinging the robot arm. Unlike a conventional one of the kind in which the robot is suspended above the conveying line, the window glass mounting apparatus according to the invention permits the use of a hanger conveyor for conveying the car body through the conveying line. This permits a greater degree of freedom in designing the automobile assembly line. Furthermore, since the inclination of the support frame with respect to the car body due to the front-end drooping of the robot arm is corrected, the window glass can be correctly mounted on the window portion of the car body, thus improving the productivity in the assembly line.

It is readily apparent that the above-described meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for mounting window glasses on an automobile in which a jig for holding the window glass is supported on a support frame in such a manner that the jig can be advanced and retreated as desired, said support frame being mounted on a robot, and the robot is operated to position the support frame at a location facing a window portion of a car body on a car body conveying line and, in this condition, move the jig forward to the window portion for mounting the window glass therein, characterized in that the robot comprises a robot arm swingable from a position outside the car body conveying line to said line and movable in the directions of the length, width and height of the car body with the car-width direction being taken as an X-axis direction, the direction in which the upper and the lower frames of the window portion face each other being taken as a Y-axis direction and the direction perpendicular to both the X-axis and Y-axis directions being taken as a Z-axis direction; the robot arm including a tilting shaft having an axis extending in the Z-axis direction when the robot arm is turned toward the conveying line, the support frame being tiltably mounted on the tilting shaft; a first detector is provided on the support frame for detecting a deviation in the X-axis direction of the jig with respect to the window portion; and a pair of second detectors are provided on the support frame for detecting deviations in the Y-axis direction of the jig with respect to the window portion, the detection being carried out at two locations which are symmetrical with respect to the X-axis direction center line of the jig.

2. An apparatus for mounting window glasses on an automobile as set forth in claim 1, wherein each of the second detectors comprises:
   a bracket mounted on the support frame;
   a measuring arm movably supported on the bracket to be advanced and retracted in the Y-axis direction, the measuring arm having at its front end an engagement piece permitting, from the Y-axis direction, engagement thereof with the upper frame of the window portion;
   means for advancing and retracting the measuring arm in the Y-axis direction; and
   an encoder for detecting a deviation of the measuring arm in the Y-axis direction.

3. An apparatus for mounting window glasses on an automobile as set forth in claim 2, wherein the engagement piece includes a shaft extending in the Y-axis direction at the rear end thereof, said shaft being rotatably mounted to the front end of the measuring arm in such a manner that the engagement piece can be oscillated in the Z-axis direction.

4. An apparatus for mounting window glasses on an automobile as set forth in any one of claims 1, 2, or 3, wherein the first detector consists of a pair of detecting units movably mounted on the support frame in such a manner to be advanced or retracted in synchronism with each other inwardly and outwardly in the X-axis direction and each of the detecting units includes a rod and an encoder with the rod mounted to contact the outer edge of one side frame of the window portion and being swingable in the X-axis direction and the encoder being connected to detect the swing angle of the rod.

5. A method of mounting window glasses on an automobile including a car body having a window portion, comprising the steps of:
  holding a window glass in a jig mounted to the working end of a robot arm;
  positioning the jig in a position facing the window portion of the car body, the jig being movable in three directions which include an X-axis direction representing the car-width direction, a Y-axis direction representing the direction in which the upper and lower frames of the window portion face each other, and a Z-axis direction representing the direction perpendicular to both the X-axis and the Y-axis directions, and the jig being tiltable about a tilting shaft which extends in the Z-axis direction and is located at the center of the jig with respect to the X-axis direction; and
  automatically mounting the window glass in the window portion;
  said step of positioning of the jig including:
    (a) first, detecting a deviation of the jig with respect to the window portion in the X-axis direction and moving, according to the deviation detected, the jig in the X-axis direction so that the tilting shaft is on the X-axis direction center line of the window portion;
    (b) second detecting deviations of the jig with respect to the window portion in the Y-axis direction at positions which are symmetrical with respect to the X-axis direction center line of the jig and tilting, according to the deviations detected, the jig by the tilting shaft to correct the inclination about the Z-axis of the jig relative to the window portion; and
    (c) third, detecting the jig deviation relative to the window portion in the Y-axis direction and moving, according to the deviation detected, the jig in the Y-axis direction to correct the positional deviation of the jig in the Y-axis direction.

6. A method of mounting window glass to a window portion of a car body on a car body conveying line using a jig for holding the window glass and movably mounted to a support frame mounted to a robot arm swingable from a position outside the car body conveying line to move the support frame to a position facing a window portion of a car body on the car body conveying line; said jig being movable to advance and mount the window glass on the window portion of the car body, said robot arm being movable in the directions of the length, width and height of the car body with the car-width direction being taken as an X-axis direction, the direction in which the upper and the lower frames of the window portion face each other being taken as a Y-axis direction and the direction perpendicular to both the X-axis and Y-axis directions being taken as a Z-axis direction; the robot arm including a tilting shaft having an axis extending in the Z-axis direction when the robot arm is turned toward the conveying line, the support frame being tiltably mounted on the tilting shaft; a first detector on the support frame for detecting a deviation in the X-axis direction of the jig with respect to the window portion; and a pair of second detectors on the support frame for detecting deviations in the Y-axis direction of the jig with respect to the window portion, the second detectors being located at two locations which are symmetrical with respect to the X-axis direction center line of the jig; comprising the steps of:
  turning the robot arm toward the car body conveying line;
  positioning the jig at a predetermined position facing the window portion; and
  advancing the jig in the Z-axis direction to mount the window glass on the window portion of the car body;
  wherein the jig positioning step consists of:
    (a) first, detecting a deviation of the jig with respect to the window portion in the X-axis direction by the first detector and moving, according to the deviation detected, the jig in the X-axis direction so that the axis of the tilting shaft crosses the X-axis direction center line of the window portion;
    (b) second, detecting deviations of the jig with respect to the window portion in the Y-axis direction by the pair of second detectors positioned at locations which are symmetrical with respect to the X-axis direction center line of the jig and correcting the inclination of the jig with respect to the window portion by tilting the support frame by the tilting shaft in such a manner that the difference between the deviations of the jig at these two locations relative to the window portion in the Y-axis direction becomes zero; and
    (c) third, moving the jig in the Y-axis direction by a distance equal to a Y-axis directing deviation of the jig detected when the difference between the deviations in the Y-axis direction at the two positions was zero, in order to correct the jig position in the Y-axis direction with respect to the window portion.

* * * * *